United States Patent [19]

Crook, Jr.

[11] Patent Number: 4,513,681
[45] Date of Patent: Apr. 30, 1985

[54] WIRE ROPE TO CHAIN CONNECTOR FOR ANCHORING SYSTEMS

[75] Inventor: Edward J. Crook, Jr., Tulsa, Okla.

[73] Assignee: The Crosby Group, Inc., Tulsa, Okla.

[21] Appl. No.: 580,762

[22] Filed: Feb. 17, 1984

Related U.S. Application Data

[63] Continuation of Ser. No. 306,760, Sep. 29, 1981, abandoned.

[51] Int. Cl.³ .............................................. B63B 21/50
[52] U.S. Cl. ........................................ 114/293; 59/93; 254/372
[58] Field of Search ............... 114/200, 210, 216, 254, 114/293; 254/372, 390; 226/53, 168, 190; 59/85, 86, 93

[56] References Cited

U.S. PATENT DOCUMENTS

| 1,321,356 | 11/1919 | Bateman | 59/93 |
| 2,435,328 | 2/1948 | Smith | 59/93 |
| 2,759,234 | 8/1956 | Brawand | 59/93 |
| 3,243,952 | 4/1966 | Page | 59/85 |
| 3,795,951 | 3/1974 | Ratcliff | 59/93 |
| 3,985,093 | 10/1976 | Eidem | 59/93 |
| 4,023,775 | 5/1977 | Beattie | 254/372 |
| 4,034,556 | 7/1977 | Riber | 59/93 |
| 4,164,378 | 8/1979 | Lineham | 114/293 |

Primary Examiner—Trygve M. Blix
Assistant Examiner—Stephen P. Avila
Attorney, Agent, or Firm—Head, Johnson & Stevenson

[57] ABSTRACT

An improved connector for coupling a chain to a wire rope or cable such that the resulting connection can be passed over a sheave, pulley, wheel or windlass without applying a bending stress to the wire rope. The connector comprises a hemispherical housing having an opening therethrough that is axially symmetric about the radius that is perpendicular to the planar portion of the hemispherical housing. The opening is adapted to accept and retain a wire rope having a terminal fitting by holding the terminal fitting within the hemispherical housing. A semi-circular member of common radius to the hemispherical housing and adapted to accept and retain a chain is attached to the planar portion of the hemispherical housing. A pair of retaining pins pass through the co-axial openings in the hemispherical housing and the end of the semi-circular member terminating on flat surfaces on opposite sides of the terminal fitting of the wire rope. In this manner the essentially spherical connector is held in an assembled state with the wire rope being rigidly affixed within the connector. Such a connector is useful in eliminating bending stress at the wire rope connector as it passes over a sheave or the like and also allows for smaller and more economical sheaves to be employed.

8 Claims, 10 Drawing Figures

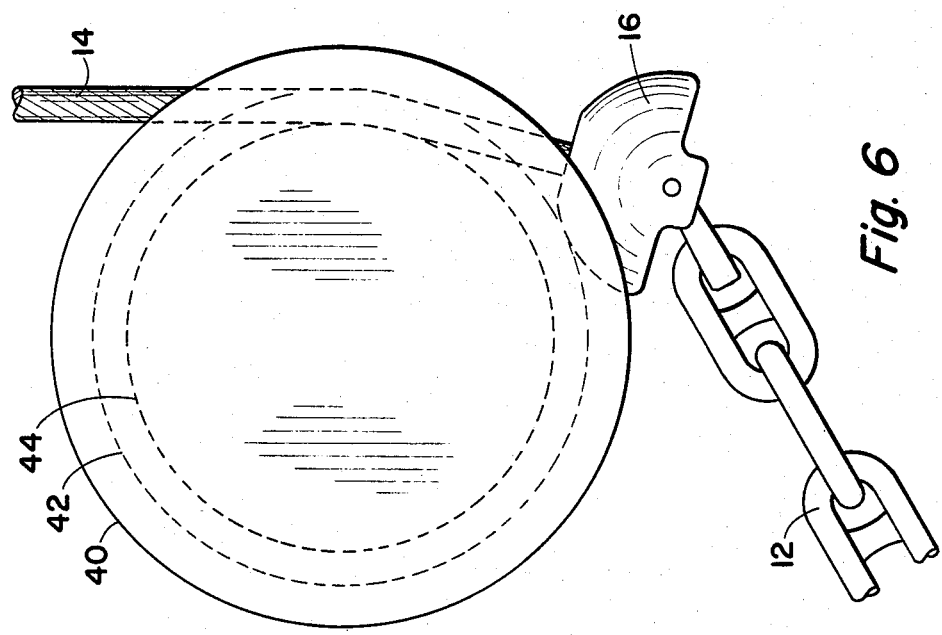
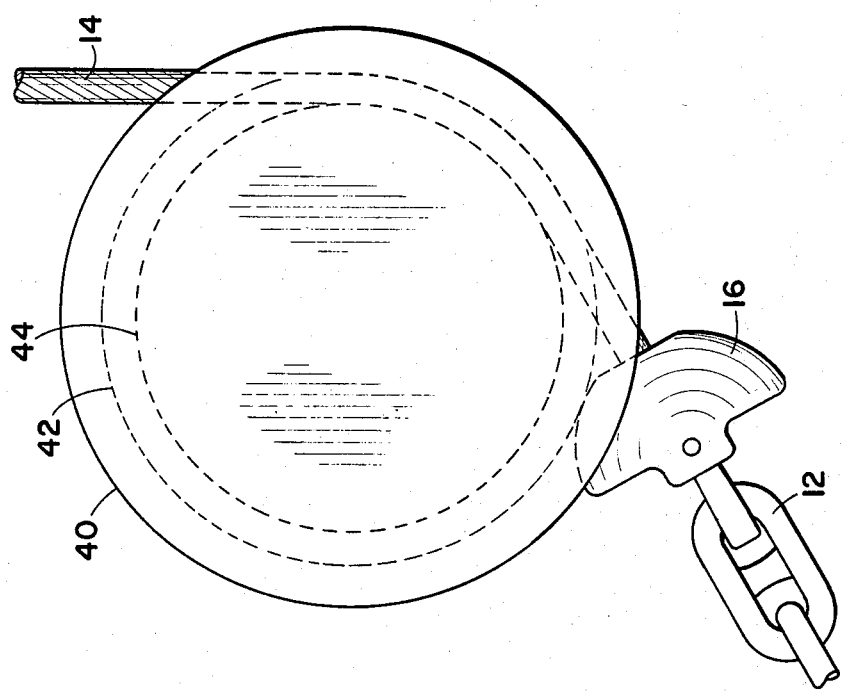

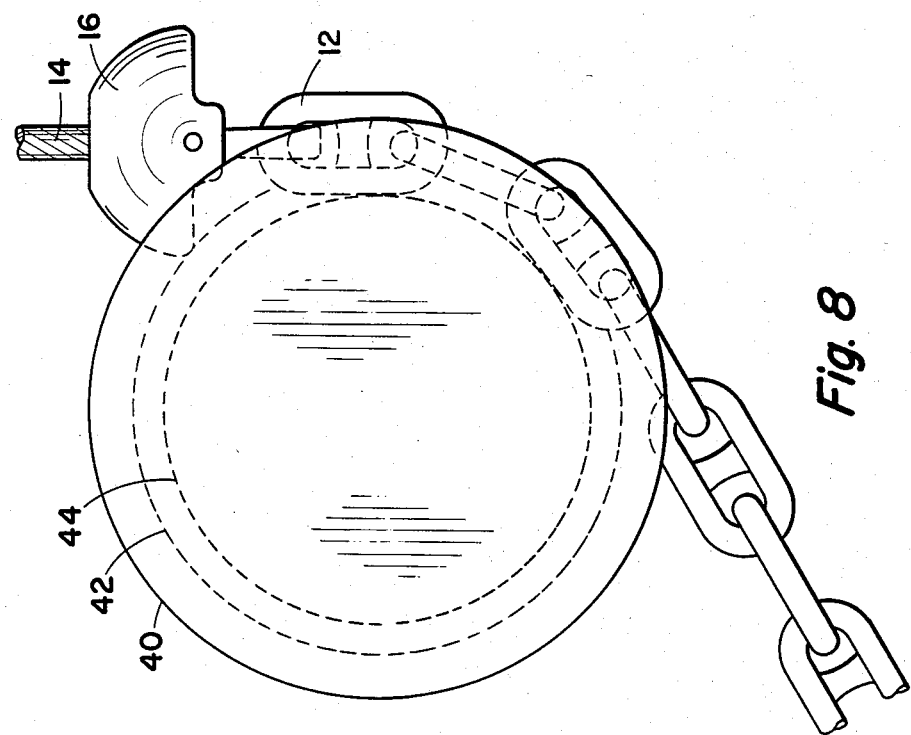
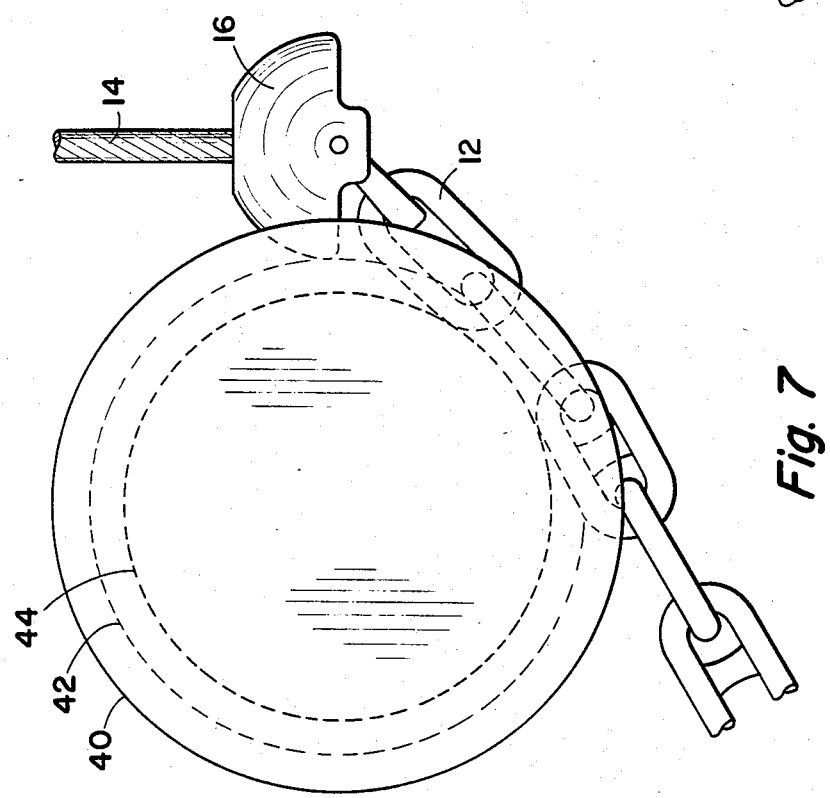

P MAX. = 1.5L
STRESS RANGE FOR L=30% OF CATALOG ROPE
STRENGTH IS 25% (20%-45%).

WIRE ROPE TO CHAIN CONNECTOR FOR ANCHORING SYSTEMS

This is a continuation application of Ser. No. 306,760, filed Sept. 29, 1981, now abandoned.

BACKGROUND OF THE INVENTION

1. Field of the Invention

This invention relates to a connector for coupling a chain to a wire rope. More specifically, this invention relates to an improved connector that allows an anchor chain to wire rope connection to pass over a wheel, sheave, or windlass without excessive stress being applied to the wire rope.

2. Description of the Prior Art

With the advent of heavy special purpose vessels, particularly offshore drilling vessels or other floating structures it has become common practice to use anchoring systems comprising a plurality of relatively long anchor lines each including a heavy anchor chain connected to a wire rope. Typically, systems employ from one to several thousand feet of anchor chain connected to the anchor and length of wire rope connected to the end of the chain opposite the anchor. In order to handle such anchor lines various methods and apparatus have been suggested and employed with varying degrees of success. Thus, it is generally known to use combination wheels or sheaves having an inner groove dimensioned to accomodate the wire rope, and an outer groove, which may be pocketed, dimensioned to accomodate the chain. In some cases it has been proposed to employ simple link connectors between the anchor chain and the wire rope, but the bending forces in the wire rope at the connection have proved too great for such an arrangement to be completely satisfactory. Accordingly, many special connectors have been proposed but many of these have limitations, such as a limit of about 90° change in direction, or even less, while traversing a wheel or sheave, or a requirement that the connection be oriented in a particular manner before it passes over the wheel or sheave.

SUMMARY OF THE INVENTION

In view of the disadvantages associated with previously available wire rope and chain connectors, I have discovered an improved connector comprising: An essentially hemispherical housing having an opening therethrough that is axially symmetric about the radius that is perpendicular to the planar portion of the hemispherical housing and wherein the opening is adapted to accept and retain a wire rope having a terminal fitting by holding the terminal fitting within the hemispherical housing; a substantially semi-circular member capable of being pivotally assembled to the planar portion of the essentially hemispherical housing and adapted to accept and retain a chain in the assembled state; and a means to maintain the substantially semi-circular member and the essentially hemispherical housing in an assembled state.

The improved connector of the present invention provides for the semi-circular member and the hemispherical housing to be equipped with openings which will be co-axial in the assembled state such that retaining pins passing through these openings will maintain the assembled state. The present invention further provides that the terminal fitting on the wire rope is a cylindrical sleeve equipped with a pair of flat surfaces on opposite sides and the pair of retaining pins used to maintain the assembled state by passing through the co-axial openings terminated on these flat surfaces such as to further hold the wire rope within the hemispherical housing. By selecting a common radius for both the semi-circular member and the hemispherical housing an essentially spherical connector results. The present invention also provides for an improved sheave that has an essentially semi-circular cross-sectioned outer groove to accept the spherical connector and an inner groove tangential to the bottom of said outer groove to accept the chain and wire rope.

A primary object of the present invention is to provide a connector for coupling a chain to a wire rope such that the resulting connection can be passed over a sheave, pulley, wheel or windlass through a relatively large angle without introducing a bending stress at the wire rope connection. It is a further object of this invention to provide a sheave and connector combination that results in minimizing the range of stress experienced in the wire rope as the connector passes over the sheave. It is further object to provide a connector that is highly flexible and one that does not require any angular alignment or orientation as it approaches and passes over the sheave. Fulfillment of these objects and the presence and fulfillment of other objects will be apparent upon reading the complete specification and claims taken in conjunction with the attached drawing.

BRIEF DESCRIPTION OF THE DRAWINGS

FIGS. 5 through 8 illustrate how the connector attached to a chain and wire rope makes contact with a sheave at various specific positions as it passes over the sheave.

DETAILED DESCRIPTION OF PREFERRED EMBODIMENT

Figure 2:
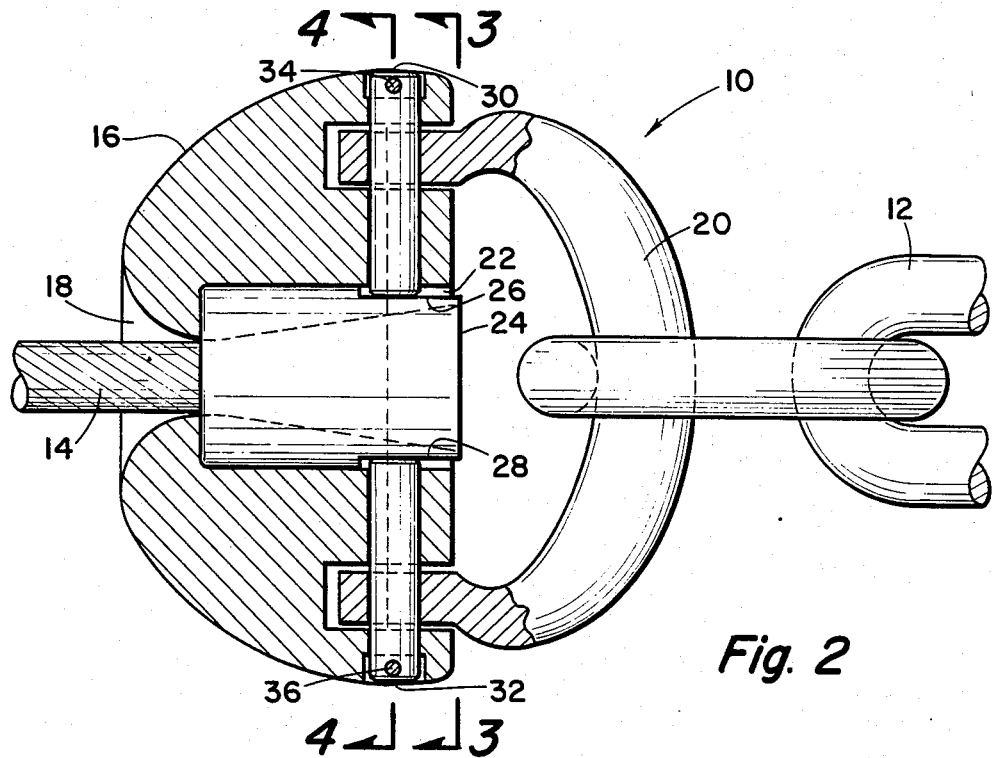
FIG. 2 is a partial cut-away side view of a preferred embodiment illustrated in FIG. 1.
Figure 1:
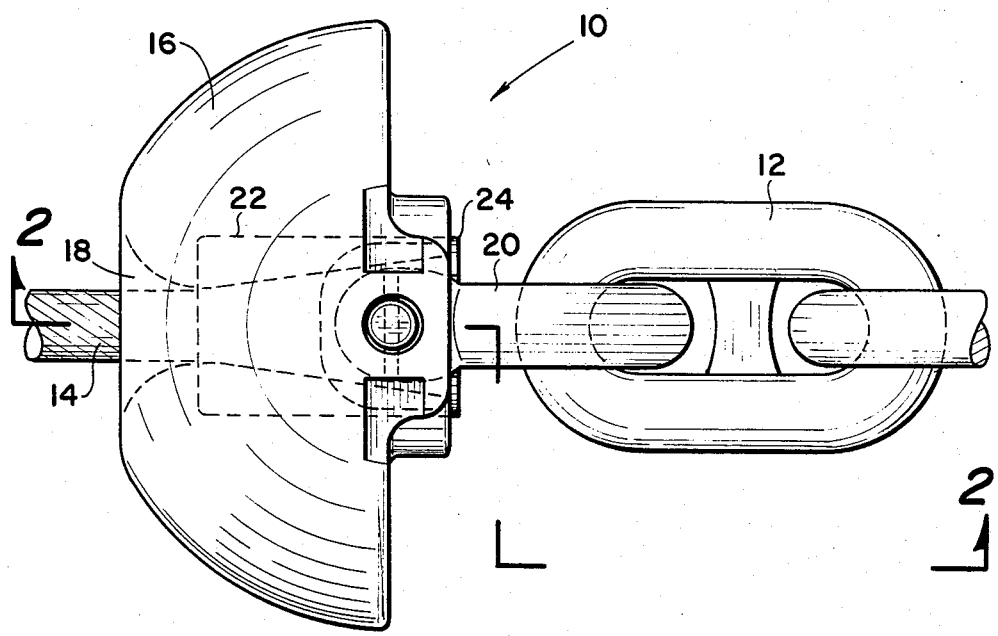
FIG. 1 is a partial cross-sectional top view of a preferred embodiment of the wire rope to chain connector according to the present invention.

The improved wire rope to chain connector of the present invention, how it functions, and its advantages over the prior art can perhaps be best explained and understood by reference to the accompany drawings. FIGS. 1 and 2 illustrate a partial cross-sectional top view and a partial cut-away side view of a preferred embodiment of the connector generally indicated by the numeral 10, while coupled to chain 12 at one end and wire rope 14 at the other end. Connector 10 is made up of an essentially hemispherical housing 16 having an opening 18. This opening 18 passes through the housing along and axially symmetric about the radius of the hemisphere that is perpendicular to the planar side of the hemisphere. In other words, the opening 18 is positioned such that it passes through the center of the hemispherical housing 16 and exits at the top or apex of the hemispherical surface. In this manner and by virtue of the rotational symmetry of the opening about this particular radius, the approach of the connector 10 to a sheave will not require any pre-orientation or alignment in that all angles of rotation about the wire rope are equivalent.

Housing 16 is further provided with a semi-circular member 20 which attaches to the planar or flat side of the hemispherical housing 16. The semi-circular member 20 is adapted to thread through the end link of chain 12 and thus retain chain 12 to connector 10.

Figure 3:
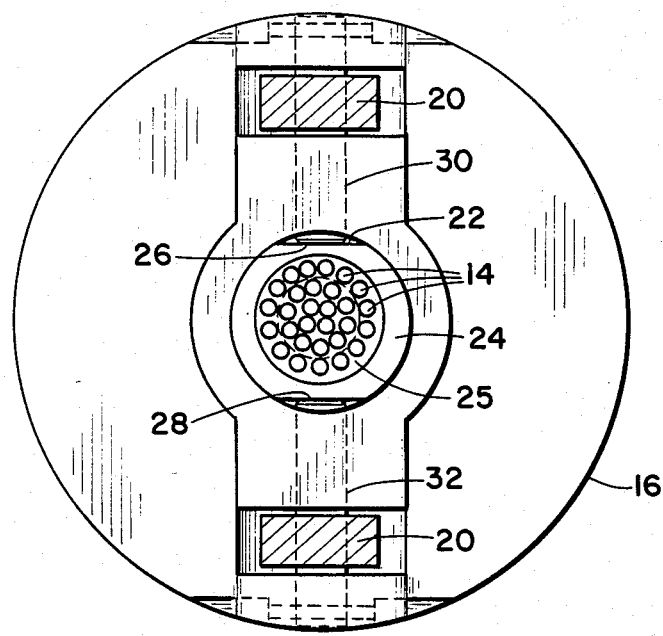
FIG. 3 is a cut-away view of a connector as seen through line 3—3 of FIG. 2.
Figure 4:
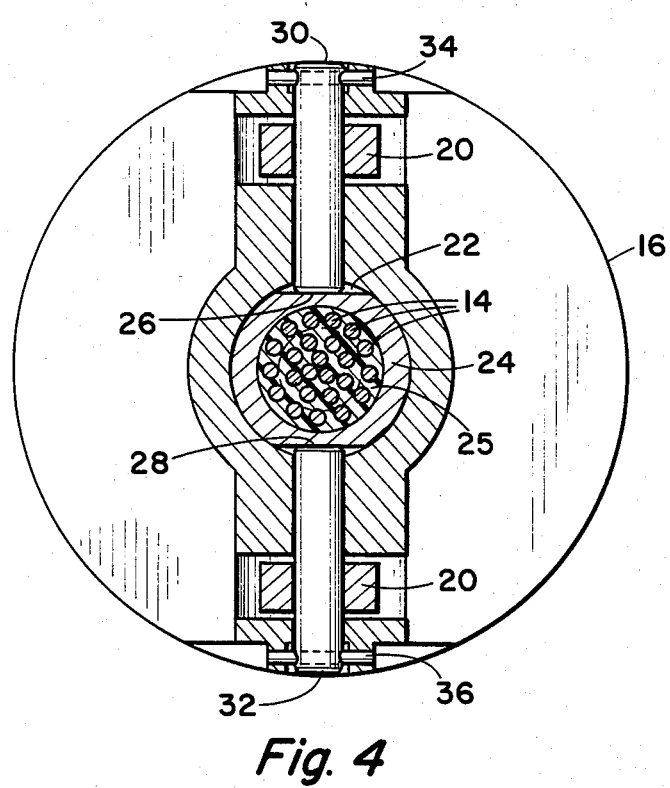
FIG. 4 is a cut-away view of a connector as seen through line 4—4 of FIG. 2.

As illustrated in FIGS. 1 and 2 opening, 18 is smoothly contoured on the exterior, narrowing down to a circular cross-section large enough to accept the wire rope 18 and then expands to a cylindrically cavity 22 on the interior of the housing 16. A terminal or end fitting 24 is provided to insert into the cavity 22. The end fitting 24 is provided with a conical interior cavity to accept the wire rope 14. The end to the wire rope 14 within the conical interior of the fitting 24, is unraveled and held rigidly in place by a filler material 25 (See FIGS. 3 and 4). In this manner, the end fitting 24 will prevent the wire rope 14 from exiting the connector 10. End fitting 24 is further provided with a pair of flat surfaces 26 and 28 at the far end on opposite sides such that retaining pins 30 and 32 will engage the surfaces and prevent the end fitting 24 and wire rope 14 from swiveling relative to housing 16 as well as preventing them from exiting the flat side of the hemispherical housing 16.

Retaining pin 30 and 32 also pass through the co-axially aligned openings in the end of the semi-circular member 20 and openings in the hemispherical housing 16 thus forming a means to retain the connector in an assembled state. Two small tightly fitting pins or rivets 34 and 36 are used to secure the retaining pins in place.

To assemble the connector illustrated in FIGS. 1 through 4, the wire rope is first threaded through opening 18 and allowed to extend beyond the backside of the hemispherical housing 16. The end of the wire rope is then threaded through the smaller opening of the terminal fitting 24 and allowed to extend out the other side. The individual strands of the wire rope are then unraveled to enlarge the size of the end of the wire rope and subsequently the unraveled part is pulled back within the conical cavity of the end fitting 24. At this point the voids surrounding the bundle of loose ends are filled with a liquid filler such as molten metal or plastic resin and the filler is allowed to set up. The protruding loose ends of wire are then trimmed off of the far end of the terminal fitting 24 and the fitting is pulled back into the cylindrically cavity 22. The semi-circular member 20 is then threaded through the end link of chain 12 and the openings in the ends of the member 20 are aligned with the opening in the housing 16 as retaining pins 30 and 32 are inserted. The wire rope end fittings 24 is then swiveled within the cavity 22 such that the flat surfaces engage the tips of pins 30 and 32. The small pins 34 and 36 are then hammered into place completing the assembly.

In operation (See FIGS. 5 through 8) the essentially hemispherical exterior surface of the housing 16 is sized to engage and rest on the outer peripheral portion of the sheave 40 over which the chain, connector, and wire rope are to traverse. While the connection engages or rests on the essentially semi-circular cross-sectioned outer groove 42 (See FIG. 9) the chain 12 and wire rope 14 (superimposed) will travel on an inner smaller groove 44 of the same sheave located essentially tangential of the bottom of the lowest portion of the outer groove 42. Because the inner and outer grooves of the sheave are similar in diameter, the lever arm induced variation in tension experienced by the wire rope as the chain, connector, and wire rope combination passes over the sheave as illustrated in FIGS. 5 through 8 and FIG. 9 is significantly less than that experienced in the prior art type connectors.

Figure 10:
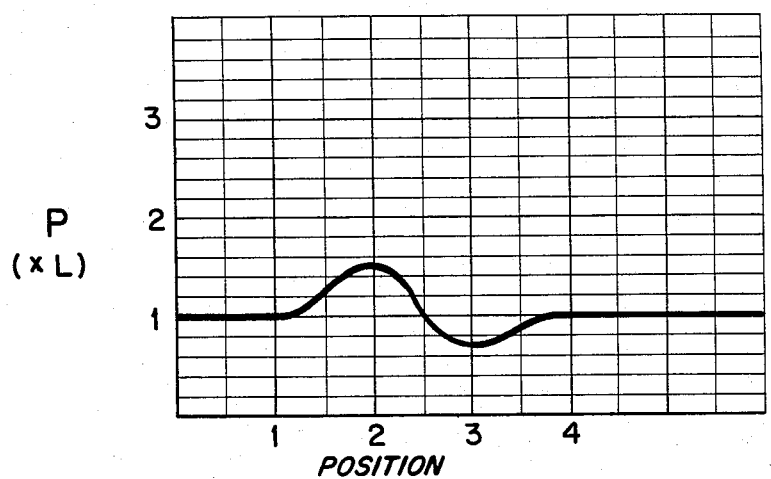
FIG. 10 is a graph of the change in the tension experienced as a function of positions illustrated in FIGS. 5 through 8.
Figure 9:
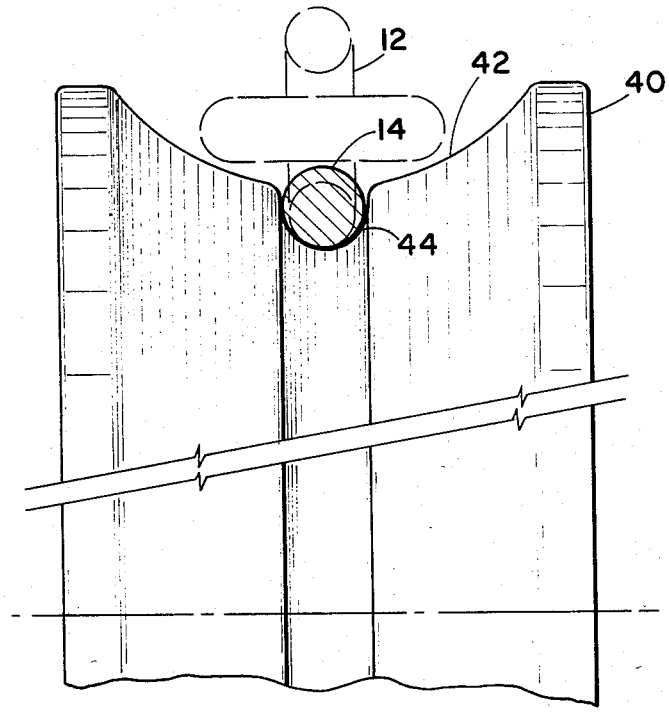
FIG. 9 is a partial cross-sectional view of an improved sheave according to the present invention.

As seen in FIG. 5 as the connector 10 approaches and just touches the outer groove 42 of the sheave 40 (Position 1) the stress associated with the illustrated approximately 60° deviation from straight vertical at the sheave is a constant (At fixed load). But as the connector passes over the sheave the change in effective lever arm associated with the inherent change in diameter between the inner groove and outer groove results in a rise in stress to a maximum value (FIG. 6, position 2). As connector 10 continues around the outer groove the stress again equilibrates and then goes through a minimum (See FIG. 7, position 3) value. As the connector leaves the sheave and the chain remains in the inner groove, the stress returns (at fixed load) to the value characteristic of that of when the wire rope was in the inner groove (FIG. 8, positionly). FIG. 10 illustrates the cyclic nature of the stress experienced when the connector passes over the sheave. Because of the relative small difference in diameters between the inner and outer groove (smaller lever arm change ) the range of stress is significantly less than that associated with the prior art connectors and sheaves. Since wire rope fatigue is more of a function of the variation in stress experienced than a function of the magnitude of the stress, the longevity and life expectancy of a wire rope in the present invention will be correspondingly longer than the respective prior art methods.

The reason that the present connector can be employed with a smaller sheave having an inner and outer groove much closer in diameter to each other is related to the compactness of the present connector. By incorporating the wire rope end fitting within the hemispherical housing the entire connector is essentially a sphere. Not only does this allow for close proximity of the inner and outer grooves but also the placing of the wire end fitting within the spherical structure virtually eliminates the inducing of bending tension in the wire rope at the end fitting when the connector passes over the sheave. By alleviating the necessity of having a significant difference in radius between the inner and outer grooves, the sheave can be designed much smaller and more compact at a significant savings in capital investment.

By virtue of reserving essentially the entire other half of the compact sphere as a means for a creating rotational freedom (i.e., the pivotally attached semi-circular member and chain) a broad range of angular motion can be achieved as the connector traverses the sheave. If extremely large angles are required between the direction the chain or wire rope approaches or exits the sheave, a plurality of connectors in series can be easily employed to distribute the peripherial entrance and exit points at a greater distance apart on the outer circumference of the sheave.

Although the preferred embodiment illustrated herein is not easily disassembled, the selection of method of retaining the semi-circular member can be easily modified by using any of the techniques or removable fasteners well known in the art, thus producing a connector that is readily disassemblable. Conveniently, the wire rope can be disassembled by the well known methods of using molten zinc or the like. However, the use of a thermo-setting resin is preferred since such techniques lead to more compact end fittings. In such a case, the wire rope is replaced by removing the pins from the housing and pushing the wire rope through the housing such as to cut off the end fitting. Also, various geometric shapes other than the cylindrical end fitting can be employed including but not limited to a frusto-conical fitting, square or rectangular fitting and the like.

Having thus describing the preferred embodiments with a certain degree of particularity, it should be understood that many changes can be made in the details of construction and the arrangement of the components without departing from the spirit and scope of this disclosure. As such the invention is not intended to be limited to the specific embodiments set forth herein for purposes of exemplication but is to limited only by the scope of the attached claims including a full range of the equivalency to which each element thereof is entitled.

I claim:

1. A connector for coupling a chain to a wire rope comprising:
    (a) an essentially hemispherical housing having a primary opening therethrough that is axially symmetric about a radius of said housing and is perpendicular to a planar portion of said hemispherical housing, said primary opening being adapted to accept and retain, in an assembled state, a wire rope and terminal fitting of said wire rope, said terminal fitting of said wire rope being a cylindrical sleeve that accepts and retains said wire rope and wherein said cylindrical sleeve is equipped with flat surfaces on opposite sides of said cylindrical sleeve said flat surfaces of said sleeve positionable opposite said co-axial openings, and said hemispherical housing equipped with co-axial openings which radially intersect with said primary opening;
    (b) a substantially semi-circular connecting link member, the ends of said link member being pivotally connected to said hemispherical housing adjacent said planar portion, said link adapted to accept and retain a chain in said assembled state; and
    (c) a retaining pin passing through each of said co-axial openings terminating adjacent said flat surfaces to maintain said substantially semi-circular connecting link member, said terminal fitting and said hemispherical housing in said assembled state.

2. A connector of claim 1, wherein said semi-circular member and said hemispherical housing are of substantially common radius thus forming an essentially spherical surface in the assembled state.

3. An anchoring system for anchoring a structure, comprising:
    (a) an anchor;
    (b) a chain attached to said anchor;
    (c) a connector for coupling a chain to a wire rope comprising;
    an essentially hemispherical housing having a primary opening therethrough that is axially symmetric about a radius of said housing and is perpendicular to a planar portion of said hemispherical housing said primary opening being adapted to accept and retain, in an assembled state, a wire rope and terminal fitting of said wire rope said terminal fitting of said wire rope being a cylindrical sleeve that accepts and retains said wire rope and wherein said cylindrical sleeve is equipped with flat surfaces on opposite sides of said cylindrical sleeve said flat surfaces of said sleeve positionable opposite said co-axial openings, and said hemispherical housing equipped with co-axial openings which radially intersect with said primary opening;
    a substantially semi-circular connecting link member, the ends of said link member being pivotally connected to said hemispherical housing adjacent said planar portion, said link adapted to accept and retain a chain in said assembled state;
    (d) a retaining pin passing through each of said co-axial openings terminating adjacent said flat surfaces to maintain said substantially semi-circular connecting link member, said terminal fitting, and said hemispherical housing in said assembled state; and
    (e) a sheave supported on said structure adapted to accept said connector in an essentially semi-circular cross-sectioned outer groove and adapted to accept said wire rope and chain in an inner groove tangential to the bottom of said outer groove.

4. An anchoring system of claim 3 wherein said substantially semi-circular member and said hemispherical housing are of substantially common radius thus forming an essentially spherical surface in the assembled state.

5. An anchoring system for anchoring a structure, comprising:
    (a) an anchor;
    (b) a chain attached to said anchor;
    (c) a connector for coupling said chain to a wire rope comprising:
    an essentially hemispherical housing having a primary opening therethrough that is axially symmetric about a radius that is perpendicular to a planar portion of said hemispherical housing and wherein said primary opening is adapted to accept and retain a wire rope having a cylindrical sleeve type terminal fitting by holding said terminal fitting within said hemispherical housing, a pair of axial aligned openings adjacent said planar portion that transversely intersect with said primary opening, said cylindrical sleeve equipped with a pair of flat surfaces on opposite sides, said sides facing said axially aligned openings;
    a substantially semi-circular connecting link member, the ends of which are pivotally assembled to said hemispherical housing adjacent said planar portion by retaining pins in said axially aligned openings, said link adapted to accept and retain a chain in the assembled stated;
    a retaining pin passing through each of said axially aligned openings and terminating on said flat surfaces of said fitting to maintain said semi-circular connecting link member, said terminal fitting and said hemispherical housing in an assembled stated;
    (d) a sheave supported on said structure adapted to accept said connector upon an essentially semi-circular cross-sectioned outer groove and adapted to accept said wire rope and chain in an inner groove tangential to the bottom of said outer groove.

6. An anchoring system of claim 5 wherein said semi-circular member and said hemispherical housing are of substantially common radius thus forming an essentially spherical surface in the assembled state.

7. A connector for coupling a chain to a wire rope comprising:
    (a) an essentially hemispherical housing having a primary opening therethrough that is axially symmetric about a radius that is perpendicular to a planar portion of said hemispherical housing said primary opening being enlarged adjacent said planar portion to accept and retain a terminal fitting, said terminal fitting being a cylindrical sleeve equipped with indentations on opposite sides of said cylindrical sleeve, said hemispherical housing equipped with co-axial openings which intersect with said enlarged portion of said primary opening;

(b) a substantially semi-circular connecting link member, the ends of said link member being pivotally assembled to said hemispherical housing adjacent said planar portion, said link adapted to accept and retain a chain in the assembled state; and (c) a retaining pin passing through each of said co-axial openings terminating contiguous to a respective indentation to maintain said substantially semi-circular connecting link member, said terminal fitting and said hemispherical housing in said assembled state.

8. A connector of claim 7 wherein said primary opening, opposite said enlarged portion, is smoothly contoured.

* * * * *

UNITED STATES PATENT AND TRADEMARK OFFICE
CERTIFICATE OF CORRECTION

PATENT NO. : 4,513,681
DATED : April 30, 1985
INVENTOR(S) : Edward J. Crook, Jr.

It is certified that error appears in the above—identified patent and that said Letters Patent is hereby corrected as shown below:

Column 5, Claim 1, line 33, after "sleeve" insert --,--; line 34, cancel the second appearance of "said"; line 35 change ", and" to --in--; line 36 cancel "equipped with co-axial openings".

Signed and Sealed this

Seventeenth Day of May, 1988

Attest:

DONALD J. QUIGG

Attesting Officer    Commissioner of Patents and Trademarks